us011591435B2

(12) United States Patent
Nishikawa et al.

(10) Patent No.: US 11,591,435 B2
(45) Date of Patent: Feb. 28, 2023

(54) POLYCARBODIIMIDE COMPOUND, PRODUCTION METHOD THEREFOR, AND RESIN COMPOSITION

(71) Applicant: NISSHINBO CHEMICAL INC., Tokyo (JP)

(72) Inventors: Naoki Nishikawa, Chiba (JP); Nami Tsukamoto, Chiba (JP); Kenichi Yanagisawa, Chiba (JP); Yoshihiro Yamazaki, Chiba (JP)

(73) Assignee: NISSHINBO CHEMICAL INC., Tokyo (JP)

( * ) Notice: Subject to any disclaimer, the term of this patent is extended or adjusted under 35 U.S.C. 154(b) by 355 days.

(21) Appl. No.: 16/605,990

(22) PCT Filed: Apr. 18, 2018

(86) PCT No.: PCT/JP2018/016036
§ 371 (c)(1),
(2) Date: Oct. 17, 2019

(87) PCT Pub. No.: WO2018/194102
PCT Pub. Date: Oct. 25, 2018

(65) Prior Publication Data
US 2021/0139632 A1 May 13, 2021

(30) Foreign Application Priority Data

Apr. 21, 2017 (JP) .............................. JP2017-084476
Dec. 28, 2017 (JP) .............................. JP2017-253219

(51) Int. Cl.
| | | |
|---|---|---|
| *C08G 18/09* | (2006.01) | |
| *C08G 18/08* | (2006.01) | |
| *C08G 18/10* | (2006.01) | |
| *C08G 18/28* | (2006.01) | |
| *C08G 18/73* | (2006.01) | |
| *C08G 18/75* | (2006.01) | |
| *C08G 18/76* | (2006.01) | |
| *C08L 33/08* | (2006.01) | |
| *C08L 67/00* | (2006.01) | |
| *C08L 75/04* | (2006.01) | |
| *C08G 18/72* | (2006.01) | |

(Continued)

(52) U.S. Cl.
CPC ....... *C08G 18/095* (2013.01); *C08G 18/0852* (2013.01); *C08G 18/10* (2013.01); *C08G 18/283* (2013.01); *C08G 18/2815* (2013.01); *C08G 18/2835* (2013.01); *C08G 18/722* (2013.01); *C08G 18/73* (2013.01); *C08G 18/755* (2013.01); *C08G 18/757* (2013.01); *C08G 18/758* (2013.01); *C08G 18/7621* (2013.01); *C08G 18/7628* (2013.01); *C08G 18/7642* (2013.01); *C08L 33/08* (2013.01); *C08L 67/00* (2013.01); *C08L 75/04* (2013.01);

*C08L 79/08* (2013.01); *C09D 11/102* (2013.01); *C09D 133/04* (2013.01); *C09D 167/02* (2013.01); *C09D 175/04* (2013.01); *C08G 2150/00* (2013.01)

(58) Field of Classification Search
CPC .. C08G 18/095; C08G 18/0852; C08G 18/10; C08G 18/2835; C08G 18/73; C08G 18/755; C08G 18/7621; C08G 18/2815; C08G 18/283; C08G 18/722; C08G 18/757; C08G 18/758; C08G 18/7628; C08G 18/7642; C08G 2150/00; C08L 33/08; C08L 67/00; C08L 75/04; C08L 79/08; C09D 133/04; C09D 11/102; C09D 167/02; C09D 175/04
See application file for complete search history.

(56) References Cited

U.S. PATENT DOCUMENTS 5,866,715 A 2/1999 Tsai
6,063,890 A 5/2000 Tye
(Continued)

FOREIGN PATENT DOCUMENTS

CN 1245175 A 2/2000
CN 1521197 A 8/2004
(Continued)

OTHER PUBLICATIONS

Chinese Office Action and Search Report for Chinese Application No. 201880025829.3. dated Mar. 1, 2021.
(Continued)

*Primary Examiner* — Patrick D Niland
(74) *Attorney, Agent, or Firm* — Birch, Stewart, Kolasch & Birch, LLP

(57) ABSTRACT

There are provided a carbodiimide compound excellent in storage stability, and performance as a crosslinking agent, and a method for producing the same, and a resin composition excellent in the film forming properties and solvent resistance of a coating made at low temperature. A polycarbodiimide compound derived from an aliphatic diisocyanate compound having at least one primary isocyanate group, the polycarbodiimide compound having a structure in which all ends are capped with an organic compound having a functional group that reacts with an isocyanate group, carbodiimide group concentration A (%) and weight average molecular weight Mw satisfying the following formula (1), and a resin composition comprising the carbodiimide compound and an aqueous resin having a predetermined acid value at a predetermined ratio.

$(A/Mw) \times 1000 \geq 0.55$      (1).

19 Claims, No Drawings

(51) Int. Cl.
*C08L 79/08* (2006.01)
*C09D 133/04* (2006.01)
*C09D 11/102* (2014.01)
*C09D 167/02* (2006.01)
*C09D 175/04* (2006.01)

(56) References Cited

U.S. PATENT DOCUMENTS

| | | | |
|---|---|---|---|
| 6,177,197 B1 | 1/2001 | Imashiro et al. | |
| 2004/0158021 A1 | 8/2004 | Sadayori et al. | |
| 2009/0171016 A1* | 7/2009 | Sato | C08K 5/29 524/608 |
| 2011/0021679 A1 | 1/2011 | Takahashi et al. | |
| 2018/0371237 A1 | 12/2018 | Tsukamoto et al. | |

FOREIGN PATENT DOCUMENTS

| | | |
|---|---|---|
| JP | 4-261429 A | 9/1992 |
| JP | 10-315615 A | 12/1998 |
| JP | 11-292598 A | 10/1999 |
| JP | 2002-3564 A | 1/2002 |
| JP | 2002-187932 A | 7/2002 |
| JP | 2007-270046 A | 10/2007 |
| JP | 2008-63442 A | 3/2008 |
| JP | 2008-156506 A | 7/2008 |
| JP | 2016-69391 A | 5/2016 |
| TW | 375625 B | 12/1999 |
| WO | WO 2017/006950 A1 | 1/2017 |

OTHER PUBLICATIONS

Pang et al., "Properties and Development of Polycarbodiimide Crosslinker," China Leather & Footwear Industry Research Institute, vol. 39, No. 1, Jan. 2010, pp. 49-51, with an English abstract.
Yan et al., "Modification and Application of Isocyanates," Paint & Coatings Industry, vol. 37, No. 8, Aug. 2007 (Aug. 1, 2007), pp. 63-66, with an English abstract.
International Search Report, issued in PCT/JP2018/016036, PCT/ISA/210, dated Jul. 17, 2018.
Extended European Search Report dated Nov. 27. 2020 for Application No. 18787786.5.
Taiwanese Office Action and Search Report for Taiwanese Application No. 107113357, dated Sep. 8, 2022.
European Communication pursuant to Article 94(3) EPC for corresponding European Application No. 18787786.5, dated Dec. 14, 2022.

* cited by examiner

POLYCARBODIIMIDE COMPOUND, PRODUCTION METHOD THEREFOR, AND RESIN COMPOSITION

TECHNICAL FIELD

The present invention relates to a polycarbodiimide compound and a method for producing the same, and a resin composition comprising the polycarbodiimide compound and an aqueous resin having an acid value.

BACKGROUND ART

Water-soluble or water-dispersible aqueous resins are used in many fields such as paints, inks, fiber treating agents, adhesives, and coating agents. Carboxy groups are generally introduced into aqueous resins in order to provide water solubility or water dispersibility to the resins themselves. As a measure for improving the various physical properties, such as strength, water resistance, and durability, of a coating of such an aqueous resin, a method of using in combination a crosslinking agent such as a carbodiimide compound that can react with the carboxy group that the aqueous resin has, to form a crosslinked structure is adopted.

For example, PTL1 discloses an aqueous resin composition comprising a urethane resin having a polymerizable unsaturated group, a carbodiimide-based crosslinking agent, and an aqueous medium.

A carbodiimide compound is generally produced by subjecting an organic polyisocyanate to carbon dioxide removal condensation in the presence of a carbodiimidization catalyst under heating conditions (for example, PTL2 to PTL4).

CITATION LIST

Patent Literature

PTL1: JP 2016-69391 A
PTL2: JP 10-315615 A
PTL3: JP 2008-156506 A
PTL4: JP 2007-270046 A

SUMMARY OF INVENTION

Technical Problem

However, the aqueous resin composition described in PTL1 needs to be heated to 140° C. during coating formation, and moreover, the solvent resistance of the coating made is insufficient.

In addition, the carbodiimide compounds described in PTL2 to PTL4 do not have sufficient storage stability and may not have sufficient performance as a crosslinking agent.

The present invention has been made in view of such circumstances, and it is an object of the present invention to provide a polycarbodiimide compound excellent in storage stability, and performance as a crosslinking agent, and a method for producing the same, and a resin composition excellent in the film forming properties and solvent resistance of a coating made at low temperature.

Solution to Problem

The present inventors have studied diligently in order to solve the above problems, and as a result found that the problems can be solved by the following inventions.

Specifically, the disclosure of this application relates to the following.

[1] A polycarbodiimide compound derived from an aliphatic diisocyanate compound having at least one primary isocyanate group, the polycarbodiimide compound having a structure in which all ends are capped with an organic compound having a functional group that reacts with an isocyanate group, a carbodiimide group concentration A (%) of the polycarbodiimide compound, and a polystyrene equivalent weight average molecular weight Mw of the polycarbodiimide compound as measured using gel permeation chromatography (GPC) satisfying the following formula (1):

$$(A/Mw) \times 1000 \geq 0.55 \quad (1)$$

[2] The polycarbodiimide compound according to the above [1], wherein the aliphatic diisocyanate compound is at least one selected from the group consisting of hexamethylene diisocyanate, isophorone diisocyanate, 1,3-bis(isocyanatomethyl)cyclohexane, and xylylene diisocyanate.

[3] The polycarbodiimide compound according to the above [1] or [2], wherein the functional group that the organic compound has is at least one selected from the group consisting of a hydroxyl group, an amino group, an isocyanate group, an epoxy group, and a carboxy group.

[4] The polycarbodiimide compound according to any one of the above [1] to [3], wherein the organic compound further has a hydrophilic group in addition to the functional group.

[5] The polycarbodiimide compound according to the above [4], wherein the hydrophilic group is an organic group represented by the following general formula (I):

$$R^1-(O-CHR^2-CH_2)_m- \quad (I)$$

wherein $R^1$ is an alkyl group having 1 to 4 carbon atoms, and $R^2$ is a hydrogen atom or a methyl group; when a plurality of $R^2$ are present, the $R^2$ may be the same as or different from each other; and m represents an integer of 1 to 30.

[6] The polycarbodiimide compound according to the above [5], wherein $R^2$ in the general formula (I) is a hydrogen atom.

[7] The polycarbodiimide compound according to the above [5] or [6], wherein $R^1$ in the general formula (I) is a methyl group or an ethyl group.

[8] The polycarbodiimide compound according to any one of the above [4] to [7], being water-soluble or water-dispersible.

[9] The polycarbodiimide compound according to any one of the above [1] to [8], wherein a number of carbodiimide groups in one molecule is 3 or more and 7 or less.

[10] The polycarbodiimide compound according to any one of the above [1] to [9], further having a carbodiimide group derived from a diisocyanate compound having no primary isocyanate group.

[11] The polycarbodiimide compound according to the above [10], further having at least one selected from the group consisting of a carbodiimide group derived from a diisocyanate compound having two secondary isocyanate groups, a carbodiimide group derived from a diisocyanate compound having two tertiary isocyanate groups, and a carbodiimide group derived from a diisocyanate compound having two aromatic isocyanate groups.

[12] The polycarbodiimide compound according to the above [11], having at least one selected from the group consisting of a carbodiimide group derived from a diisocyanate compound having two secondary isocyanate groups, and a carbodiimide group derived from a diisocyanate compound having two tertiary isocyanate groups.

[13] A method for producing the polycarbodiimide compound according to any one of the above [1] to [12], wherein a carbodiimide polymerization reaction is performed in a solvent, and a temperature of the carbodiimide polymerization reaction is 115° C. or higher and 165° C. or lower.
[14] The method for producing the polycarbodiimide compound according to the above [13], wherein the organic compound is added before start of the carbodiimide polymerization reaction, at the start of the carbodiimide polymerization reaction, or during the carbodiimide polymerization reaction.
[15] The method for producing the polycarbodiimide compound according to the above [13] or [14], wherein the solvent is an aprotic solvent.
[16] The method for producing the polycarbodiimide compound according to the above [15], wherein the aprotic solvent is an aprotic water-soluble solvent.
[17] A resin composition comprising the polycarbodiimide compound according to any one of the above [1] to [12] and an aqueous resin having an acid value, wherein an acid value of a solid content of the aqueous resin is 5 mg KOH/g or more, and a ratio of a number of moles a of the carbodiimide group of the polycarbodiimide compound to a number of moles b of a functional group that reacts with a carbodiimide group, as calculated from the acid value of a solid content of the aqueous resin, a/b, is 0.4 or more and 4.5 or less.
[18] The resin composition according to the above [17], wherein a functional group that the aqueous resin has is a carboxy group.
[19] The resin composition according to the above [17] or [18], wherein the aqueous resin is at least one resin selected from the group consisting of polyurethane resins, acrylic resins, and polyester resins.
[20] A paint composition comprising the resin composition according to any one of the above [17] to [19].
[21] A coating agent composition comprising the resin composition according to any one of the above [17] to [19].
[22] An ink composition comprising the resin composition according to any one of the above [17] to [19].

Advantageous Effects of Invention

According to the present invention, it is possible to provide a carbodiimide compound excellent in storage stability, and performance as a crosslinking agent, and a method for producing the same. In addition, it is possible to provide a resin composition excellent in the film forming properties and solvent resistance of a coating made at low temperature.

DESCRIPTION OF EMBODIMENTS

[Polycarbodiimide Compound]

The polycarbodiimide compound of the present invention is a polycarbodiimide compound derived from an aliphatic diisocyanate compound having at least one primary isocyanate group and is characterized in that the polycarbodiimide compound has a structure in which all ends are capped with an organic compound having a functional group that reacts with an isocyanate group, and the carbodiimide group concentration A (%) of the polycarbodiimide compound, and the polystyrene equivalent weight average molecular weight Mw of the polycarbodiimide compound as measured using gel permeation chromatography (GPC) satisfy the following formula (1):

$$(A/Mw) \times 1000 \geq 0.55 \tag{1}$$

The carbodiimide group concentration A is a value defined by the following formula (2) from the formula weight of the carbodiimide group, 40, and the molar amount of the carbodiimide group in 1 g of the carbodiimide compound, n, obtained by titration. Specifically, the carbodiimide group concentration A is obtained by a method described in the following Examples.

$$A = 40 \times n \times 100 \tag{2}$$

In the polycarbodiimide compound of the present invention, $(A/Mw) \times 1000$ is 0.55 or more in the formula (1). In the synthesis of the polycarbodiimide compound, with the carbodiimidization reaction, the reaction of the produced carbodiimide groups with each other and the reaction of the produced carbodiimide groups with isocyanate groups proceed as side reactions. In addition, polycarbodiimide compounds having higher molecular weights than necessary may be produced. When $(A/Mw) \times 1000$ is less than 0.55 in the formula (1), such side reactions and polycarbodiimide compounds having higher molecular weights than necessary increase, and the storage stability of the polycarbodiimide compound, and the performance of the polycarbodiimide compound as a crosslinking agent may decrease. In addition, the film forming properties and solvent resistance of a coating made at low temperature using a resin composition comprising the polycarbodiimide compound may decrease. From such viewpoints, $(A/Mw) \times 1000$ is preferably 0.56 or more, more preferably 0.57 or more.

The carbodiimide group concentration A is preferably 5 to 30%, more preferably 6 to 25%, and further preferably 9 to 20%. By setting A within the above range, it is easy to obtain the polycarbodiimide compound satisfying the above formula (1).

The polycarbodiimide compound has a carbodiimide structure derived from an aliphatic diisocyanate compound having at least one primary isocyanate group. The polycarbodiimide compound has a structure in which all ends are capped with an organic compound having a functional group that reacts with an isocyanate group (hereinafter also simply referred to as an "organic compound"). When the polycarbodiimide compound has a carbodiimide group derived from an aliphatic diisocyanate compound having at least one primary isocyanate group, the film forming properties of a coating made at low temperature using a resin composition comprising the polycarbodiimide compound, and the solvent resistance, adhesiveness, and hot water resistance of the coating can be improved. In addition, the polycarbodiimide compound preferably has a structure in which at least one end is capped with a hydrophilic group, more preferably a structure in which all ends are capped with hydrophilic groups, from the viewpoint of increasing compatibility with an aqueous resin.

Examples of the aliphatic diisocyanate compound having at least one primary isocyanate group (hereinafter also simply referred to as an "aliphatic diisocyanate compound") include linear aliphatic diisocyanate compounds such as hexamethylene diisocyanate (HDI), ethylene diisocyanate, tetramethylene diisocyanate, and dodecamethylene diisocyanate; aliphatic diisocyanate compounds having a branched structure, such as 2,2,4-trimethylhexamethylene diisocyanate; aliphatic diisocyanate compounds having an alicyclic structure, such as 1,3-bis(isocyanatomethyl)cyclohexane (HXDI), isophorone diisocyanate (IPDI), and norbornane diisocyanate (NBDI), and aliphatic diisocyanate compounds having an aromatic ring, such as xylylene diisocyanate. Especially, from the viewpoint of easy availability, at least one selected from the group consisting of hexamethylene diisocyanate, isophorone diisocyanate, 1,3-bis(isocyanatomethyl)cyclohexane, and xylylene diisocyanate is preferred, and hexamethylene diisocyanate is more preferred. These may be used singly or in combinations of two or more.

The polycarbodiimide compound has, as a component from which it is derived, the aliphatic diisocyanate compound having at least one primary isocyanate group, and may have another diisocyanate compound (hereinafter sometimes referred to as an "optional diisocyanate compound") in a range that does not impair the effects of the present invention.

Here, another diisocyanate compound (optional diisocyanate compound) means a diisocyanate compound having no primary isocyanate group.

Examples of the optional diisocyanate compound include diisocyanate compounds having two isocyanate groups selected from the group consisting of secondary isocyanate groups, tertiary isocyanate groups, and aromatic isocyanate groups. As one mode, examples of the optional diisocyanate compound include diisocyanate compounds having two secondary isocyanate groups, diisocyanate compounds having two tertiary isocyanate groups, and diisocyanate compounds having two aromatic isocyanate groups.

Examples of the diisocyanate compounds having two secondary isocyanate groups include 4,4'-dicyclohexylmethane diisocyanate (HMDI) and cyclohexane diisocyanate (CHDI). Examples of the diisocyanate compounds having two tertiary isocyanate groups include tetramethylxylylene diisocyanate (TMXDI). Examples of the diisocyanate compounds having two aromatic isocyanate groups include 4,4'-diphenylmethane diisocyanate, 4,4'-diphenyl ether diisocyanate, p-phenylene diisocyanate, m-phenylene diisocyanate, 3,3'-dimethoxy-4,4'-biphenyl diisocyanate, o-tolidine diisocyanate, naphthylene diisocyanate, 2,4-tolylene diisocyanate, 2,6-tolylene diisocyanate, 3,3'-dimethyl-4,4'-diphenyl ether diisocyanate, 3,3'-dimethyl-4,4'-diphenyl ether diisocyanate, and 2,3,6-triisopropylbenzene-1,3-diyl diisocyanate. These may be used singly or in combinations of two or more.

When the optional diisocyanate compound is used, the amount of the optional diisocyanate compound blended is preferably 3 mol or less, more preferably 2 mol or less, based on 1 mol of the diisocyanate compound having the primary isocyanate group.

In addition, when the optional diisocyanate compound is used, the diisocyanate compounds having two secondary isocyanate groups and the diisocyanate compounds having two tertiary isocyanate groups are more preferred from the viewpoint of the weather resistance of a paint composition, a coating agent composition, and an ink composition comprising a polycarbodiimide compound obtained using the optional diisocyanate compound.

The polycarbodiimide compound has a structure in which all its ends are capped with an organic compound having a functional group that reacts with the isocyanate group derived from the aliphatic diisocyanate compound.

The isocyanate group capped with the organic compound may be a primary isocyanate group and may be a secondary isocyanate group, a tertiary isocyanate group, or an aromatic isocyanate group.

The polycarbodiimide compound can be obtained, for example, by capping with the organic compound all terminal isocyanate groups in polycarbodiimide whose terminal isocyanate groups are not capped, obtained by polymerizing the aliphatic diisocyanate compound. Here, the terminal isocyanate groups may be primary isocyanate groups and may be secondary isocyanate groups, tertiary isocyanate groups, or aromatic isocyanate groups.

The functional group that the organic compound has is preferably at least one selected from the group consisting of a hydroxyl group, an amino group, an isocyanate group, an epoxy group, and a carboxy group. Among these, a hydroxyl group is more preferred in terms of the ease of the reaction with an isocyanate group.

The organic compound preferably further has a group having hydrophilicity, in addition to the functional group from the viewpoint of increasing compatibility with an aqueous resin.

The above group having hydrophilicity is preferably an organic group represented by the following general formula (I) from the viewpoint of increasing compatibility with an aqueous resin.

$$R^1-(O-CHR^2-CH_2)_m- \quad (I)$$

wherein $R^1$ is an alkyl group having 1 to 4 carbon atoms, and $R^2$ is a hydrogen atom or a methyl group; when a plurality of $R^2$ are present, the $R^2$ may be the same as or different from each other; and m represents an integer of 1 to 30.

Examples of the alkyl group having 1 to 4 carbon atoms for $R^1$ include a methyl group, an ethyl group, a n-propyl group, an isopropyl group, a n-butyl group, a sec-butyl group, an isobutyl group, and a tert-butyl group. Especially, from the viewpoint of hydrophilicity, a methyl group and an ethyl group are preferred, and a methyl group is more preferred.

As $R^2$, a hydrogen atom is preferred.

m is an integer of 1 to 30, and is preferably an integer of 1 to 20, more preferably an integer of 4 to 15, from the viewpoint of easy availability.

Specific examples of the organic compound having a functional group that reacts with an isocyanate group include organic compounds having a hydroxyl group, such as polyethylene glycol monomethyl ether, polyethylene glycol monoethyl ether, polyethylene glycol monophenyl ether, polypropylene glycol monomethyl ether, polypropylene glycol monoethyl ether, polypropylene glycol monophenyl ether, tetraethylene glycol monomethyl ether, tetraethylene glycol monoethyl ether, triethylene glycol monomethyl ether, triethylene glycol monoethyl ether, diethylene glycol monomethyl ether, diethylene glycol monoethyl ether, dodecyl alcohol, octyl alcohol, hexyl alcohol, pentyl alcohol, butyl alcohol, propyl alcohol, and ethyl alcohol; organic compounds having an amino group, such as methylamine, ethylamine, propylamine, butylamine, pentylamine, hexylamine, octylamine, dodecylamine, diethylamine, dipropylamine, dibutylamine, cyclohexylamine, adamantanamine, allylamine, polyoxyethylene laurylamine, polyoxymethylene stearylamine, aniline, diphenylamine, 3-aminopropyltrimethoxysilane, 3-aminopropyltriethoxysilane, N-phenyl-3-aminopropyltrimethoxysilane, 2,2-difluoroamine, fluorobenzylamine, trifluoroethylamine, [[4-(trifluoromethyl)cyclohexyl]methyl]amine, and derivatives thereof; organic compounds having an isocyanate group, such as butyl isocyanate, pentyl isocyanate, hexyl isocyanate, octyl isocyanate, dodecyl isocyanate, cyclohexyl isocyanate, 1-adamantyl isocyanate, 3-isocyanatepropyltriethoxysilane, 2-isocyanatoethyl acrylate, benzyl isocyanate, 2-phenylethyl isocyanate, and derivatives thereof; organic compounds having an epoxy group, such as 1,2-epoxyheptane, 1,2-epoxyhexane, 1,2-epoxydecane, 1,2-epoxy-5-hexene, ethyl glycidyl ether, 2-ethylhexyl glycidyl ether, glycidyl lauryl ether, allyl glycidyl ether, diethoxy(3- glycidyloxypropyl)methylsilane, 3-[2-(perfluorohexyl) ethoxy]-1,2-epoxypropane, and derivatives thereof; and organic compounds having a carboxy group, such as acetic acid, ethanoic acid, propionic acid, butanoic acid, pentanoic acid, hexanoic acid, heptanoic acid, octanoic acid, nonanoic acid, decanoic acid, cyclohexanecarboxylic acid, adamantaneacetic acid, phenylacetic acid, benzoic acid, undecenoic acid, and derivatives thereof.

Especially, polyethylene glycol monomethyl ether (MPEG), tetraethylene glycol monomethyl ether (MTEG), and dodecyl alcohol (DA) are preferred, and polyethylene glycol monomethyl ether and tetraethylene glycol monomethyl ether are more preferred. These may be used singly or in combinations of two or more.

The polycarbodiimide compound is preferably water-soluble or water-dispersible.

The number of carbodiimide groups in one molecule of the polycarbodiimide compound is preferably 3 or more and 7 or less from the viewpoint of storage stability and from the viewpoint of the storage stability of the resin composition and the film forming properties and solvent resistance of a coating made at low temperature.

The polycarbodiimide compound of the present invention is excellent in storage stability, and performance as a crosslinking agent and therefore can be preferably used for crosslinking agents for aqueous paints, aqueous inks, fiber treating agents, adhesives, coating agents, and the like.

[Method for Producing Polycarbodiimide Compound]

The method for producing a polycarbodiimide compound according to the present invention is not particularly limited, and examples thereof include a method of performing a carbodiimide polymerization reaction in a solvent. The temperature of the carbodiimide polymerization reaction is preferably 115° C. or higher and 175° C. or lower, more preferably 115° C. or higher and 165° C. or lower, further preferably 120° C. or higher and 160° C. or lower, still further preferably 130° C. or higher and 150° C. or lower, and still further preferably 135° C. or higher and 150° C. or lower.

By setting the temperature of the carbodiimide polymerization reaction within the above range, the progress of side reactions and the production of polycarbodiimide compounds having higher molecular weights than necessary can be suppressed, and the storage stability, and the performance as a crosslinking agent can be increased. In addition, the film forming properties and solvent resistance of a coating made using a resin composition comprising the obtained polycarbodiimide compound can be improved. Further, by setting the carbodiimide polymerization reaction temperature within the above range, it is easy to obtain a polycarbodiimide compound satisfying the formula (1).

The reaction time of the above carbodiimide polymerization reaction is appropriately adjusted by the above carbodiimide polymerization reaction temperature and is preferably 8 to 100 h, more preferably 10 to 80 h, and further preferably 15 to 60 h.

As the aliphatic diisocyanate compound having at least one primary isocyanate group, and the organic compound having a functional group that reacts with an isocyanate group, used in the method for producing a polycarbodiimide compound according to the present invention, the compounds mentioned in the above section [Polycarbodiimide Compound] can be used.

From the viewpoint of suppressing the gelation of the reaction product, the organic compound is preferably added before the start of the carbodiimide polymerization reaction, at the start of the carbodiimide polymerization reaction, or during the carbodiimide polymerization reaction and more preferably added before the start of the carbodiimide polymerization reaction or at the start of the carbodiimide polymerization reaction.

By reacting the aliphatic diisocyanate compound, and/or the carbodiimide compound during the polymerization reaction, with the organic compound, the isocyanate group that the aliphatic diisocyanate compound has and/or the isocyanate group that the carbodiimide compound during the polymerization reaction has are capped with the organic compound.

The reaction temperature in the capping is preferably 0 to 250° C., more preferably 50 to 230° C., and further preferably 80 to 200° C. The reaction time in the above reaction is appropriately adjusted by the above reaction temperature and is preferably 0.5 to 24 h, more preferably 1 to 8 h, and further preferably 2 to 5 h.

The amount of the organic compound blended is preferably 30 to 200 parts by mass, more preferably 60 to 180 parts by mass, and further preferably 70 to 165 parts by mass based on 100 parts by mass of the aliphatic diisocyanate compound. By setting the amount of the organic compound blended at 30 parts by mass or more, gelation is suppressed. By setting the amount of the organic compound blended at 200 parts by mass or less, the carbodiimide group concentration of the polycarbodiimide compound can be increased.

Examples of the catalyst used in the carbodiimide polymerization reaction include phospholene oxides such as 1-methyl-2-phospholene-1-oxide, 1-phenyl-2-phospholene-1-oxide, 3-methyl-1-phenyl-2-phospholene-1-oxide, 1-ethyl-2-phospholene-1-oxide, 3-methyl-2-phospholene-1-oxide, and 3-phospholene isomers thereof. Especially, 3-methyl-1-phenyl-2-phospholene-1-oxide (MPO) is preferred from the viewpoint of reactivity.

The amount of the catalyst used is preferably 0.5 to 5 parts by mass, more preferably 1 to 3 parts by mass, based on 100 parts by mass of the aliphatic diisocyanate compound.

The carbodiimide polymerization reaction is preferably performed in a solvent. When the carbodiimide polymerization reaction is performed without a solvent, side reactions proceed, and polycarbodiimide compounds having higher molecular weights than necessary may be produced.

As the solvent used in the carbodiimide polymerization reaction, aprotic solvents are preferred from the viewpoint of gelation suppression.

Examples of the aprotic solvents include aprotic water-insoluble solvents such as xylene, butyl acetate, cyclohexanone, methylcyclohexanone, pentyl acetate, mineral spirits, and benzyl benzoate; and aprotic water-soluble solvents such as diethylene glycol methyl ethyl ether, diethylene glycol diethyl ether, diethylene glycol dimethyl ether, dipropylene glycol methyl ethyl ether, dipropylene glycol diethyl ether, dipropylene glycol dimethyl ether, triethylene glycol methyl ethyl ether, triethylene glycol diethyl ether, triethylene glycol dimethyl ether, tetraethylene glycol methyl ethyl ether, tetraethylene glycol diethyl ether, tetraethylene glycol dimethyl ether, diethylene glycol monoethyl ether acetate, diethylene glycol monomethyl ether acetate, dipropylene glycol monoethyl ether acetate, dipropylene glycol monomethyl ether acetate, γ-butyrolactone, N-methylpyrrolidone, N-ethylpyrrolidone, N,N-dimethylformamide, and N,N-dimethylacetamide. Especially, aprotic water-soluble solvents are preferred, and diethylene glycol methyl ethyl ether (MEDG), diethylene glycol diethyl ether (DEDG), and diethylene glycol monoethyl ether acetate (ECA) are more preferably used. These may be used singly or in combinations of two or more.

The concentration of the aliphatic diisocyanate compound in the solvent is preferably 10 to 90% by mass, more preferably 20 to 60% by mass, and further preferably 30 to 60% by mass.

The polycarbodiimide compound obtained in this manner has a carbodiimide structure derived from an aliphatic diisocyanate compound having at least one primary isocyanate group, and a structure in which all ends are capped with an organic compound having a functional group that reacts with an isocyanate group. The polycarbodiimide compound is excellent in storage stability, and performance as a crosslinking agent.

[Resin Composition]

The resin composition of the present invention comprises the polycarbodiimide compound and an aqueous resin having an acid value and is characterized in that the acid value of a solid content of the aqueous resin is 5 mg KOH/g or more, and the ratio of the number of moles a of the carbodiimide group of the polycarbodiimide compound to the number of moles b of a functional group that reacts with a carbodiimide group, as calculated from the acid value of a solid content of the aqueous resin, a/b, is 0.4 or more and 4.5 or less.

The polycarbodiimide compound (hereinafter also referred to as a resin crosslinking agent) acts as a crosslinking agent for the aqueous resin.

The resin composition of the present invention is excellent in the film forming properties and solvent resistance of a coating at low temperature and therefore can be preferably used by being contained in a paint composition, a coating agent composition, an ink composition, or the like.

(Aqueous Resin)

The aqueous resin has an acid value of a solid content of 5 mg KOH/g or more. When the acid value of a solid content is 5 mg KOH/g or more, the aqueous resin is sufficiently crosslinked, and the solvent resistance of a coating of the obtained resin composition improves, and further the adhesiveness and the hot water resistance improve. The acid value of a solid content of the aqueous resin is preferably 5 to 100 mg KOH/g, more preferably 5 to 80 mg KOH/g, from the viewpoint of easy availability.

Here, the acid value of a solid content is a numerical value representing the amount of the functional group that reacts with a carbodiimide group, such as a carboxy group, a sulfo group, and a phosphate group, contained in the resin, and is the number of mg of potassium hydroxide required to neutralize the functional group that reacts with a carbodiimide group and is an acid component, contained in 1 g of the resin. As the functional group that is an acid component, especially, a carboxy group is preferred.

The acid value of a solid content can be calculated by the following formula (3) by measuring the amount of a 1 N potassium hydroxide aqueous solution used in potentiometric titration. Specifically, the acid value of a solid content can be obtained by a method described in the following Examples.

$$\text{acid value of a solid content (mg KOH/g)} = (B \times f \times 56.11)/S \quad (3)$$

wherein B represents the amount (ml) of the 1 N potassium hydroxide aqueous solution used in the titration, f represents the factor of the 1 N potassium hydroxide aqueous solution, and S represents the mass (g) of the dry aqueous resin.

The ratio of the number of moles a of the carbodiimide group of the polycarbodiimide compound to the number of moles b of the functional group that reacts with a carbodiimide group, as calculated from the acid value of a solid content of the aqueous resin, a/b, is 0.4 or more and 4.5 or less, preferably 0.4 or more and 3.0 or less, and more preferably 0.4 or more and 2.5 or less. When a/b is 0.4 or more, the film forming properties and solvent resistance of a coating made at low temperature using the resin composition improve. When a/b is 4.5 or less, the solvent resistance and smoothness of a coating of the resin composition improve.

The number of moles b of the functional group that reacts with a carbodiimide group, in the aqueous resin can be calculated by the following formula (4). Here, the functional group that reacts with a carbodiimide group, in the aqueous resin means a functional group exhibiting an acid value.

$$b = \text{amount of solids blended (g) in aqueous resin} \times \text{acid value of a solid content (mg KOH/g) of aqueous resin}/56,110 \text{ (mg)} \quad (4)$$

The aqueous resin is not particularly limited as long as it is an aqueous resin whose acid value of a solid content satisfies 5 mg KOH/g or more. The aqueous resin is preferably at least one resin selected from the group consisting of polyurethane resins, acrylic resins, polyester resins, acid-modified polyvinyl alcohol, acid-modified polyolefins, and other acid-modified aqueous resins, and especially, preferably at least one resin selected from the group consisting of polyurethane resins, acrylic resins, and polyester resins.

As used herein, "polyurethane resins" have both a urethane bond and an acrylic group and include acrylic urethane resins having both a urethane bond and an acrylic group.

<Polyurethane Resins>

The polyurethane resins are not particularly limited as long as the acid value of a solid content satisfies 5 mg KOH/g or more. Examples of the polyurethane resins can include resins produced by reacting a polyisocyanate compound with an acid component-containing polyol compound and a polyol compound other than an acid component-containing polyol compound.

Examples of the polyisocyanate compound include aliphatic diisocyanate compounds such as lysine diisocyanate, hexamethylene diisocyanate, and trimethylhexane diisocyanate; alicyclic diisocyanate compounds such as isophorone diisocyanate, methylcyclohexane-2,4-diisocyanate, methylcyclohexane-2,6-diisocyanate, 4,4'-methylenebis(cyclohexyl isocyanate), and 1,3-(isocyanatomethyl)cyclohexane; aromatic diisocyanate compounds such as tolylene diisocyanate, xylylene diisocyanate, and diphenylmethane diisocyanate; organic polyisocyanates such as trivalent or higher-valent polyisocyanates such as lysine triisocyanate; adducts of the above organic polyisocyanates and polyhydric alcohols, low molecular weight polyester resins, water, or the like; cyclopolymers of the above organic polyisocyanates with each other (for example, isocyanurates), biuret type adducts, and any combination thereof.

Examples of the acid component-containing polyol compound include 2,2-dimethylolpropionic acid, 2,2-dimethylolbutanoic acid, 2,2-dimethylolvaleric acid, polyester polyols having a carboxy group obtained by reacting a polyol having a carboxy group with a polyvalent carboxylic acid, and polyester polyols obtained by reacting a dicarboxylic acid such as 5-sulfoisophthalic acid, sulfoterephthalic acid, 4-sulfophthalic acid, or 5-(4-sulfophenoxy)isophthalic acid, or a salt thereof with a low molecular polyol such as ethylene glycol, propylene glycol, 1,4-butanediol, 1,6-hexanediol, diethylene glycol, or neopentyl glycol.

The polyol compound other than an acid component-containing polyol compound is not particularly limited, and examples thereof include aliphatic polyols, polyols having an alicyclic structure, aromatic polyols, polyester polyols, polycarbonate polyols, and polyether polyols. As used herein, an alicyclic structure also includes one having a heteroatom such as an oxygen atom or a nitrogen atom in the ring.

The aliphatic polyols are not particularly limited, and examples thereof include aliphatic polyols having 3 to 12 carbon atoms. Specific examples include linear aliphatic diols such as 1,3-propanediol, 1,4-butanediol, 1,5-pentanediol, 1,6-hexanediol, 1,7-heptanediol, 1,8-octanediol, and 1,9-nonanediol; branched aliphatic diols such as 2-methyl-1,3-propanediol, 2-methyl-1,5-pentanediol, 3-methyl-1,5-pentanediol, and 2-methyl-1,9-nonanediol; and tri- or higher functional polyhydric alcohols such as 1,1,1-trimethylolpropane and pentaerythritol.

The polyols having an alicyclic structure are not particularly limited, and examples thereof include polyols having an alicyclic group having 5 to 12 carbon atoms in the main chain. Specific examples include diols having an alicyclic structure in the main chain, such as structural isomers of 1,4-cyclohexanedimethanol, 1,3-cyclohexanedimethanol, 1,4-cyclohexanediol, 1,3-cyclopentanediol, 1,4-cycloheptanediol, 2,5-bis(hydroxymethyl)-1,4-dioxane, 2,7-norbornanediol, tetrahydrofurandimethanol, 1,4-bis(hydroxyethoxy)cyclohexane, and tricyclodecanedimethanol typified by tricyclo[5.2.1.0$^{2,6}$]decanedimethanol, or mixtures thereof. Especially, 1,4-cyclohexanedimethanol is preferred from the viewpoint of easy availability.

The aromatic polyols are not particularly limited, and examples thereof include 1,4-benzenedimethanol, 1,3-benzenedimethanol, 1,2-benzenedimethanol, 4,4'-naphthalenedimethanol, and 3,4'-naphthalenedimethanol.

The polyester polyols are not particularly limited, and examples thereof include polyester polyols of hydroxy carboxylic acids and diols, such as a polyester polyol of 6-hydroxycaproic acid and hexanediol, and polyester polyols of dicarboxylic acids and diols, such as a polyester polyol of adipic acid and hexanediol.

The polyether polyols are not particularly limited, and examples thereof include polyethylene glycols such as diethylene glycol, triethylene glycol, and tetraethylene glycol; and polyalkylene glycols such as polypropylene glycol and polytetramethylene glycol.

<Acrylic Resins>

The acrylic resins are not particularly limited as long as the acid value of a solid content satisfies 5 mg KOH/g or more. For example, the acrylic resins can be produced by copolymerizing an acid component-containing polymerizable unsaturated monomer and another polymerizable unsaturated monomer copolymerizable with the acid component-containing polymerizable unsaturated monomer by a known method, for example, a method such as a solution polymerization method in an organic solvent, an emulsion polymerization method in water, or a miniemulsion polymerization method in water.

The acid component-containing polymerizable unsaturated monomer is a compound having one or more carboxy groups, sulfo groups, or phosphate groups and one or more polymerizable unsaturated bonds in one molecule. Examples of the acid component-containing polymerizable unsaturated monomer include (meth)acrylic acid, maleic acid, fumaric acid, crotonic acid, itaconic acid, citraconic acid, maleic anhydride, monomethyl maleate, monobutyl maleate, monomethyl itaconate, monobutyl itaconate, vinylbenzoic acid, monohydroxyethyl (meth)acrylate oxalate, carboxy group-terminated caprolactone-modified acrylate, carboxy group-terminated caprolactone-modified methacrylate, styrene derivatives such as styrenesulfonic acid and salts thereof, 2-acrylamido-2-methylpropanesulfonic acid, 2-sulfoethyl (meth)acrylate, sodium salts and ammonium salts of sulfonic acids such as allylsulfonic acid and 4-styrenesulfonic acid, acid phosphoxyethyl (meth)acrylate, acid phosphoxypropyl (meth)acrylate, acid phosphoxypoly(oxyethylene) glycol (meth)acrylate, acid phosphoxypoly(oxypropylene) glycol (meth)acrylate, and any combination thereof.

The another polymerizable unsaturated monomer is not particularly limited, and examples thereof can include the following (1) to (16). In order to exhibit the performance derived from the monomer, one or two or more of them can be appropriately selected and used.

(1) Alkyl or Cycloalkyl (Meth)Acrylates:
methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, tert-butylcyclohexyl (meth)acrylate, cyclododecyl (meth)acrylate, tricyclodecanyl (meth)acrylate, and the like (2) Polymerizable unsaturated monomers having an isobornyl group:
isobornyl (meth)acrylate and the like (3) Polymerizable unsaturated monomers having an adamantyl group:
adamantyl (meth)acrylate and the like (4) Polymerizable unsaturated monomers having a tricyclodecenyl group:
tricyclodecenyl (meth)acrylate and the like (5) Aromatic ring-containing polymerizable unsaturated monomers:
benzyl (meth)acrylate, styrene, α-methylstyrene, vinyltoluene, and the like (6) Polymerizable unsaturated monomers having an alkoxysilyl group:
vinyltrimethoxysilane, vinyltriethoxysilane, vinyltris(2-methoxyethoxy)silane, γ-(meth)acryloyloxypropyltrimethoxysilane, γ-(meth)acryloyloxypropyltriethoxysilane, and the like (7) Polymerizable unsaturated monomers having a fluorinated alkyl group:
perfluoroalkyl (meth)acrylates such as perfluorobutylethyl (meth)acrylate and perfluorooctylethyl (meth)acrylate; fluoroolefins; and the like (8) Polymerizable unsaturated monomers having a photopolymerizable functional group such as a maleimide group (9) Vinyl compounds:
N-vinylpyrrolidone, ethylene, butadiene, chloroprene, vinyl propionate, vinyl acetate, and the like

(10) Nitrogen-containing polymerizable unsaturated monomers:
(meth)acrylonitrile, (meth)acrylamide, N,N-dimethylaminoethyl (meth)acrylate, N,N-diethylaminoethyl (meth)acrylate, N,N-dimethylaminopropyl(meth)acrylamide, methylenebis(meth)acrylamide, ethylenebis(meth)acrylamide, adducts of glycidyl (meth)acrylate and amine compounds, and the like

(11) Polymerizable unsaturated monomers having two or more polymerizable unsaturated groups in one molecule:
allyl (meth)acrylate, 1,6-hexanediol di(meth)acrylate, and the like

(12) Epoxy group-containing polymerizable unsaturated monomers:

glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, and the like

(13) (Meth)acrylates having a polyoxyethylene chain having an alkoxy group at a molecular end

(14) Polymerizable unsaturated monomers having an ultraviolet absorbing functional group:

2-hydroxy-4-(3-methacryloyloxy-2-hydroxypropoxy) benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, 2-(2'-hydroxy-5'-methacryloyloxyethylphenyl)-2H-benzotriazole, and the like

(15) Ultraviolet-stable polymerizable unsaturated monomers:

4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth) acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine, and the like

(16) Polymerizable unsaturated monomers having a carbonyl group:

acrolein, diacetone acrylamide, diacetone methacrylamide, acetoacetoxyethyl methacrylate, formylstyrol, vinyl alkyl ketones having 4 to 7 carbon atoms (for example, vinyl methyl ketone, vinyl ethyl ketone, and vinyl butyl ketone), and the like <Polyester Resins>

The polyester resins are not particularly limited as long as the acid value of a solid content satisfies 5 mg KOH/g or more. For example, the polyester resins can be produced by the esterification reaction or transesterification reaction of an acid component with an alcohol component.

Examples of the acid component include compounds usually used as acid components in the production of polyester resins and can include aliphatic polybasic acids, alicyclic polybasic acids, aromatic polybasic acids, and anhydrides and esterified products thereof.

Examples of the aliphatic polybasic acids and anhydrides and esterified products thereof generally include aliphatic compounds having two or more carboxy groups in one molecule, and acid anhydrides and esterified products of the aliphatic compounds and include aliphatic polyvalent carboxylic acids such as succinic acid, glutaric acid, adipic acid, pimelic acid, suberic acid, azelaic acid, sebacic acid, undecanedioic acid, dodecanedioic acid, brassylic acid, octadecanedioic acid, citric acid, and butanetetra carboxylic acid; anhydrides of the aliphatic polyvalent carboxylic acids; esterified products of the aliphatic polyvalent carboxylic acids with lower alkyls having 1 to 4 carbon atoms; and any combination thereof.

As the aliphatic polybasic acids, adipic acid and/or adipic anhydride are preferred from the viewpoint of the smoothness of the obtained coating.

Examples of the alicyclic polybasic acids and anhydrides and esterified products thereof generally include compounds having one or more alicyclic structures and two or more carboxy groups in one molecule, and acid anhydrides and esterified products of the compounds. The alicyclic structures are mainly four- to six-membered ring structures. Examples of the alicyclic polybasic acids and anhydrides and esterified products thereof include alicyclic polyvalent carboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, and 1,3,5-cyclohexanetricarboxylic acid; anhydrides of the alicyclic polyvalent carboxylic acids; esterified products of the alicyclic polyvalent carboxylic acids with lower alkyls having 1 to 4 carbon atoms; and any combination thereof. Especially, from the viewpoint of the smoothness of the obtained coating, 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid, and 4-cyclohexene-1,2-dicarboxylic anhydride are preferred, and 1,2-cyclohexanedicarboxylic acid and 1,2-cyclohexanedicarboxylic anhydride are more preferred.

Examples of the aromatic polybasic acids and anhydrides and esterified products thereof generally include aromatic compounds having two or more carboxy groups in one molecule, and acid anhydrides and esterified products of the aromatic compounds and include aromatic polyvalent carboxylic acids such as phthalic acid, isophthalic acid, terephthalic acid, naphthalenedicarboxylic acid, 4,4'-biphenyldicarboxylic acid, trimellitic acid, and pyromellitic acid; anhydrides of the aromatic polyvalent carboxylic acids; esterified products of the aromatic polyvalent carboxylic acids with lower alkyls having 1 to 4 carbon atoms; and any combination thereof.

As the aromatic polybasic acids and anhydrides and esterified products thereof, phthalic acid, phthalic anhydride, isophthalic acid, trimellitic acid, and trimellitic anhydride are preferred.

Examples of the acid component include acid components other than the aliphatic polybasic acids, the alicyclic polybasic acids, and the aromatic polybasic acids, for example, fatty acids such as coconut oil fatty acids, cottonseed oil fatty acids, hempseed oil fatty acids, rice bran oil fatty acids, fish oil fatty acids, tall oil fatty acids, soybean oil fatty acids, linseed oil fatty acids, tung oil fatty acids, rapeseed oil fatty acids, castor oil fatty acids, dehydrated castor oil fatty acids, and safflower oil fatty acids; monocarboxylic acids such as lauric acid, myristic acid, palmitic acid, stearic acid, oleic acid, linoleic acid, linolenic acid, benzoic acid, p-tert-butylbenzoic acid, cyclohexanoic acid, and 10-phenyloctadecanoic acid; hydroxycarboxylic acids such as lactic acid, 3-hydroxybutanoic acid, and 3-hydroxy-4-ethoxybenzoic acid; and any combination thereof.

Examples of the alcohol component include polyhydric alcohols having two or more hydroxyl groups in one molecule, for example, dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, neopentyl glycol hydroxypivalate ester, hydrogenated bisphenol A, hydrogenated bisphenol F, and dimethylolpropionic acid;

polylactone diols obtained by adding lactone compounds such as ε-caprolactone to the dihydric alcohols; ester diol compounds such as bis(hydroxyethyl) terephthalate; polyether diol compounds such as alkylene oxide adducts of bisphenol A, polyethylene glycol, polypropylene glycol, and polybutylene glycol; trihydric or higher-hydric alcohols such as glycerin, trimethylolethane, trimethylolpropane, diglycerin, triglycerin, 1,2,6-hexanetriol, pentaerythritol, dipentaerythritol, tris(2-hydroxyethyl)isocyanuric acid, sorbitol, and mannite; polylactone polyol compounds obtained by adding lactone compounds such as ε-caprolactone to the trihydric or higher-hydric alcohols; fatty acid esterified products of glycerin, 2,2-dimethylolpropionic acid, 2,2-dimethylolbutanoic acid, 2,2-dimethylolvaleric acid, polyester polyols having a carboxy group obtained by reacting a polyol having a carboxy group with a polyvalent carboxylic acid, and polyester polyols obtained by reacting a dicarboxylic acid such as 5-sulfoisophthalic acid, sulfoterephthalic acid, 4-sulfophthalic acid, or 5-(4-sulfophenoxy)isophthalic acid, or a salt thereof with a low molecular polyol such as ethylene glycol, propylene glycol, 1,4-butanediol, 1,6-hexanediol, diethylene glycol, or neopentyl glycol.

When the acid component and the alcohol component are subjected to an esterification reaction or a transesterification reaction, a known catalyst such as dibutyltin oxide, antimony trioxide, zinc acetate, manganese acetate, cobalt acetate, calcium acetate, lead acetate, tetrabutyl titanate, or tetraisopropyl titanate can be added to the reaction system as a catalyst for promoting the reaction.

The polyester resins may be modified with fatty acids, monoepoxy compounds, polyisocyanate compounds, or the like during or after the preparation of the polyester resins.

In addition to the polycarbodiimide compound and the aqueous resin, optional additives can be blended into the resin composition of the present invention in a range that does not inhibit the effects of the present invention. Specific examples of the additives include viscosity modifiers, solvents, plasticizers, inorganic or organic fillers, coloring pigments, dyes, dispersing agents, wetting agents, antifoaming agents, preservatives, fungicides, and rust preventives.

The resin composition of the present invention can be prepared by uniformly dispersing and mixing a blend of predetermined amounts of the above-described components.

The content of the polycarbodiimide compound and the aqueous resin in 100% by mass of the solids in the resin composition of the present invention is preferably 15% by mass or more, more preferably 30% by mass or more, further preferably 60% by mass or more, and still further preferably 95% by mass or more though it depends on the types and combination of the additives.

EXAMPLES

The present invention will be specifically described below by giving Examples and Comparative Examples, but the present invention is not limited to the modes described in the Examples.

The details of the components used in the synthesis of the following polycarbodiimide compounds are as follows.
<Aliphatic Diisocyanate Compounds Having at Least One Primary Isocyanate Group>
  HDL hexamethylene diisocyanate
  IPDL isophorone diisocyanate
  HXDL 1,3-bis(isocyanatomethyl)cyclohexane
  XDL xylylene diisocyanate <Diisocyanate Compounds Having No Primary Isocyanate Group (Other Diisocyanate Compounds)>
  HMDP 4,4'-dicyclohexylmethane diisocyanate
  TMXDP tetramethylxylylene diisocyanate
  TDP tolylene diisocyanate
<Organic Compounds Having Functional Group that Reacts with Isocyanate Group>
  MPEG400: polyethylene glycol monomethyl ether, average molecular weight: 400
  MPEG550: polyethylene glycol monomethyl ether, average molecular weight 550
  MTEG: tetraethylene glycol monomethyl ether, molecular weight 208
  DA: dodecyl alcohol, molecular weight 186
<Carbodiimidization Catalyst>
  MPO: 3-methyl-1-phenyl-2-phospholene-1-oxide
<Solvents>
  MEDG: diethylene glycol methyl ethyl ether, manufactured by NIPPON NYUKAZAI CO., LTD.
  DEDG: diethylene glycol diethyl ether, manufactured by NIPPON NYUKAZAI CO., LTD.
  ECA: diethylene glycol monoethyl ether acetate
[Synthesis of Polycarbodiimide Compounds (1)]

The polycarbodiimide compounds obtained in the following Examples and Comparative Examples were analyzed and evaluated for the following evaluation items. The evaluation results are shown in the following Tables 1 to 3.

The polycarbodiimide compounds obtained in Comparative Examples A2 and A5 were gels and therefore were not analyzed or evaluated.
(Evaluation Items)
(1) Measurement of Weight Average Molecular Weight Mw The weight average molecular weight Mw was measured by a gel permeation chromatography (GPC) method. The following apparatus and conditions were used for the measurement to obtain the polystyrene equivalent weight average molecular weight.
<GPC Measuring Apparatus>
  RI detector: RID-6A, manufactured by SHIMADZU CORPORATION
  Columns: KF-806, KF-804L, and KF-804L, manufactured by Showa Denko K.K.
<Measurement Conditions>
  Developing solvent: THF
  Measurement temperature: 40° C.
  Flow rate: 1.0 mL/min
  Sample concentration: 0.005 mg/mL
  Amount injected: 50 µl
  Calibration curves: STANDARD SL-105 and SM-105, manufactured by Showa Denko K.K.
(2) Measurement of Carbodiimide Group Concentration A (%) of Polycarbodiimide Compound A HIRANUMA Automatic Titrator COM-1700A (manufactured by HIRANUMA SANGYO Co., Ltd.) was used. A defined amount of an oxalic acid/dioxane solution having a known concentration was added to a polycarbodiimide compound B (g), and the mixture was sufficiently reacted in tetrahydrofuran. Then, the amount of unreacted oxalic acid was obtained by potentiometric titration with a sodium hydroxide aqueous solution, and the molar amount of oxalic acid that reacted with the carbodiimide group in the polycarbodiimide compound, b, was calculated. From this value, the molar amount of the carbodiimide group contained in 1 g of the polycarbodiimide compound, n=b/B, was calculated, and further the carbodiimide group concentration A (%) of the polycarbodiimide compound was obtained by the following formula (2):

$$A = 40 \times n \times 100 \qquad (2)$$

(3) Calculation of (A/Mw)×1000 [A: Carbodiimide Group Concentration (%) of Polycarbodiimide Compound, Mw: Weight Average Molecular Weight of Polycarbodiimide Compound]

From the weight average molecular weight Mw of the polycarbodiimide compound measured in the above (1), and the carbodiimide group concentration A (%) of the polycarbodiimide compound calculated in the above (2), (A/Mw)×1000 [A: the carbodiimide group concentration (%) of the polycarbodiimide compound, Mw: the weight average molecular weight of the polycarbodiimide compound] was calculated.

Shelf Life Measurement

Each polycarbodiimide compound (resin crosslinking agent) was stored at 50° C. and room temperature (25° C.) for 30 days, and the state after a lapse of 30 days was visually observed, and evaluated by the following criteria:
  G: solids do not precipitate, and the fluidity is maintained
  F: solids precipitate, or the fluidity disappears (5) Rubbing Test 1.0 g of each polycarbodiimide compound (resin crosslinking agent) and 10 g of a polyurethane resin (trade name: Sancure 777, manufactured by Lubrizol) were mixed to prepare an aqueous resin composition. After the preparation, the aqueous resin composition was cast on an aluminum plate (200 mm×100 mm×1 mm) so that the thickness was 20 μm, thereby forming a coating, followed by crosslinking at 80° C. for 10 min or at 25° C. for 24 h. Thus, a test piece was made.

The test piece made was double-rubbed (number of rubbings: 100 times) with a load of 900 g/cm$^2$ by a friction tester ER-1B (manufactured by Suga Test Instruments Co., Ltd.) using ethanol for a solvent, and the state of the coating was visually observed, and evaluated by the following criteria:
  G: the coating does not dissolve
  F: the coating dissolves Example A1

100 Parts by mass of hexamethylene diisocyanate (HDI), 80 parts by mass of polyethylene glycol monomethyl ether (MPEG400) (average molecular weight: 400), and 221 parts by mass of diethylene glycol methyl ethyl ether (MEDG) as a solvent were placed in a reaction container with a reflux tube and a stirrer and stirred under a nitrogen gas flow at 115° C. for 2 h. Then, 2 parts by mass of 3-methyl-1-phenyl-2-phospholene-1-oxide (MPO) as a carbodiimidization catalyst was added, and the mixture was stirred under a nitrogen gas flow at 115° C. for 72 h to obtain polyethylene glycol monomethyl ether-terminated hexamethylenepolycarbodiimide (polycarbodiimide compound).

Examples A2 to A9

Polycarbodiimide compounds were obtained in the same manner as Example A1 except that in Example A1, the types of the components and the amounts of the components blended, the carbodiimide polymerization reaction temperature, and the polymerization reaction time were as shown in the following Table 1. In Table 1, the blanks indicate no blending.

TABLE 1

| | | | Examples | | | | | | | | |
|---|---|---|---|---|---|---|---|---|---|---|---|
| | | Unit | A1 | A2 | A3 | A4 | A5 | A6 | A7 | A8 | A9 |
| Aliphatic diisocyanate compound | HDI | Parts by mass | 100 | 100 | 100 | 100 | 100 | 100 | 100 | 100 | 100 |
| Organic compounds | MPEG400 | Parts by mass | 80 | 80 | 80 | 80 | 80 | 80 | | | |
| | MPEG550 | Parts by mass | | | | | | | | 82 | 164 |
| | MTEG | Parts by mass | | | | | | | | | 31 |
| | DA | Parts by mass | | | | | | | 28 | | |
| Carbodiimidization catalyst | MPO | Parts by mass | 2 | 2 | 2 | 2 | 2 | 2 | 2 | 2 | 2 |
| Solvents | MEDG | Parts by mass | 221 | 158 | 158 | 158 | | | 158 | 158 | 221 |
| | DEDG | Parts by mass | | | | | 158 | | | | |
| | ECA | Parts by mass | | | | | | 158 | | | |
| Carbodiimide polymerization reaction temperature | | ° C. | 115 | 140 | 160 | 165 | 140 | 140 | 140 | 140 | 140 |
| Carbodiimide polymerization reaction time | | Parts by mass | 72 | 24 | 15 | 10 | 24 | 24 | 24 | 24 | 24 |
| State of reaction product | | | Transparent liquid | Transparent liquid | Transparent liquid | Transparent liquid | Transparent liquid | Transparent liquid | White liquid | Transparent liquid | Transparent liquid |

TABLE 1-continued

|  | Unit | A1 | A2 | A3 | A4 | A5 | A6 | A7 | A8 | A9 |
|---|---|---|---|---|---|---|---|---|---|---|
| Number of carbodiimide groups | — | 5 | 5 | 5 | 5 | 5 | 5 | 5 | 3 | 7 |
| Carbodiimide group concentration A | % | 10.39 | 10.38 | 10.95 | 11.34 | 10.20 | 10.18 | 7.96 | 5.83 | 16.76 |
| Weight average molecular weight Mw | — | 11808 | 10361 | 13027 | 17217 | 13170 | 14791 | 3925 | 5260 | 16295 |
| (A/Mw) × 1000 | — | 0.880 | 1.002 | 0.841 | 0.659 | 0.775 | 0.688 | 2.029 | 1.108 | 1.029 |
| Shelf life measurement (storage for 30 days) | 50° C. | G | G | G | G | G | G | G | G | G |
|  | 25° C. | G | G | G | G | G | G | G | G | G |
| Rubbing tests (crosslinked test piece) | (80° C., 10 min) | G | G | G | G | G | G | G | G | G |
|  | (25° C., 24 h) | G | G | G | G | G | G | G | G | G |

Example A10

100 Parts by mass of hexamethylene diisocyanate (HDI), 80 parts by mass of polyethylene glycol monomethyl ether (MPEG400) (average molecular weight: 400), 158 parts by mass of diethylene glycol methyl ethyl ether (MEDG) as a solvent, and 2 parts by mass of 3-methyl-1-phenyl-2-phospholene-1-oxide (MPO) as a carbodiimidization catalyst were placed in a reaction container with a reflux tube and a stirrer and stirred under a nitrogen gas flow at 140° C. for 24 h to obtain polyethylene glycol monomethyl ether-terminated hexamethylenepolycarbodiimide (polycarbodiimide compound).

Example A11

100 Parts by mass of hexamethylene diisocyanate (HDI), 132 parts by mass of isophorone diisocyanate (IPDI), 80 parts by mass of polyethylene glycol monomethyl ether (MPEG400) (average molecular weight: 400), and 158 parts by mass of diethylene glycol monoethyl ether acetate (ECA) as a solvent were placed in a reaction container with a reflux tube and a stirrer and stirred under a nitrogen gas flow at 140° C. for 2 h. Then, 2 parts by mass of 3-methyl-1-phenyl-2-phospholene-1-oxide (MPO) as a carbodiimidization catalyst was added, and the mixture was stirred under a nitrogen gas flow at 140° C. for 24 h to obtain polyethylene glycol monomethyl ether-terminated hexamethylene/isophorone polycarbodiimide (polycarbodiimide compound).

Examples A12 to A16

Polycarbodiimide compounds were obtained in the same manner as Example A11 with the types of the components and the amounts of the components blended, the carbodiimide polymerization reaction temperature, and the polymerization reaction time being as shown in the following Table 2, in Example A11. In Table 2, the blanks indicate no blending.

TABLE 2

|  |  | Unit | A10 | A11 | A12 | A13 | A14 | A15 | A16 |
|---|---|---|---|---|---|---|---|---|---|
| Aliphatic diisocyanate compounds | HDI | Parts by mass | 100 | 100 |  | 100 |  |  |  |
|  | IPDI | Parts by mass |  | 132 | 132 |  |  | 132 |  |
|  | HXDI | Parts by mass |  |  |  |  | 116 | 116 | 116 |
|  | XDI | Parts by mass |  |  |  |  |  |  | 113 |
| Organic compound | MPEG400 | Parts by mass | 80 | 80 | 80 | 159 | 80 | 159 | 80 |
| Carbodiimidization catalyst | MPO | Parts by mass | 2 | 2 | 2 | 2 | 2 | 2 | 2 |
| Solvents | MEDG | Parts by mass | 158 |  |  |  |  |  |  |
|  | ECA | Parts by mass |  | 158 | 158 | 331 | 158 | 362 | 256 |
| Carbodiimide polymerization reaction temperature |  | ° C. | 140 | 140 | 140 | 140 | 140 | 140 | 140 |
| Carbodiimide polymerization reaction time |  | h | 24 | 24 | 24 | 24 | 24 | 24 | 15 |
| State of reaction product |  |  | Transparent liquid | Transparent liquid | Transparent liquid | Transparent liquid | Transparent liquid | Transparent liquid | Transparent liquid |
| Number of carbodiimide groups |  | — | 5 | 5 | 5 | 5 | 5 | 5 | 5 |

TABLE 2-continued

| | Unit | A10 | A11 | A12 | A13 | A14 | A15 | A16 |
|---|---|---|---|---|---|---|---|---|
| Carbodiimide group concentration A | % | 9.72 | 10.40 | 9.10 | 10.23 | 9.35 | 9.42 | 9.31 |
| Weight average molecular weight Mw | — | 16785 | 7041 | 4332 | 9607 | 9155 | 8672 | 10053 |
| (A/Mw) × 1000 | — | 0.579 | 1.477 | 2.101 | 1.065 | 1.021 | 1.086 | 0.926 |
| Shelf life measurement (storage for 30 days) | 50° C. | G | G | G | G | G | G | G |
| | 25° C. | G | G | G | G | G | G | G |
| Rubbing tests (crosslinked test piece) | (80° C., 10 min) | G | G | G | G | G | G | G |
| | (25° C., 24 h) | G | G | G | G | G | G | G |

Comparative Example A1

100 Parts by mass of hexamethylene diisocyanate (HDI), 80 parts by mass of polyethylene glycol monomethyl ether (MPEG400) (average molecular weight: 400), and 158 parts by mass of diethylene glycol diethyl ether (DEDG) as a solvent were placed in a reaction container with a reflux tube and a stirrer. The mixture was stirred under a nitrogen gas flow at 165° C. for 2 h. Then, 2 parts by mass of 3-methyl-1-phenyl-2-phospholene-1-oxide (MPO) as a carbodiimidization catalyst was added, and the mixture was stirred at 180° C. for 8 h to obtain polyethylene glycol monomethyl ether-terminated hexamethylenepolycarbodiimide (polycarbodiimide compound).

Comparative Examples A2 to A5

Polycarbodiimide compounds were obtained in the same manner as Comparative Example A1 with the types of the components and the amounts of the components blended, the carbodiimide polymerization reaction temperature, and the polymerization reaction time being as shown in the following Table 3, in Comparative Example A1. In Table 3, the blanks indicate no blending.

TABLE 3

| | | Unit | A1 | A2 | A3 | A4 | A5 |
|---|---|---|---|---|---|---|---|
| Aliphatic diisocyanate compound | HDI | Parts by mass | 100 | 100 | 100 | 100 | 100 |
| Organic compound | MPEG400 | Parts by mass | 80 | 80 | | | |
| | MPEG550 | Parts by mass | | | | 164 | 164 |
| Carbodiimidization catalyst | MPO | Parts by mass | 2 | 2 | 2 | 2 | 2 |
| Solvents | MEDG | Parts by mass | | 221 | | | 158 |
| | DEDG | Parts by mass | 158 | | | | |
| Carbodiimide polymerization reaction temperature | | ° C. | 180 | 100 | 140 | 180 | 140 |
| Carbodiimide polymerization reaction time | | h | 8 | 60 | 24 | 5 | 3.5 |
| State of reaction product | | | Transparent liquid | Gel | Transparent liquid | Transparent liquid | Gel |
| Number of carbodiimide groups | | — | 5 | — | 3 | 3 | — |
| Carbodiimide group concentration A | | % | 10.94 | — | 5.15 | 5.25 | — |
| Weight average molecular weight Mw | | — | 21481 | — | 9933 | 22294 | — |
| (A/Mw) × 1000 | | — | 0.509 | — | 0.518 | 0.236 | — |
| Shelf life measurement (storage for 30 days) | 50° C. | | F | — | F | F | — |
| | 25° C. | | G | — | F | F | — |
| Rubbing tests (crosslinked test piece) | (80° C., 10 min) | | G | — | G | G | — |
| | (25° C., 24 h) | | G | — | G | G | — |

The polycarbodiimide compounds obtained in Examples A1 to A16 all satisfied formula (1) and were excellent in storage stability, and performance as a crosslinking agent.

[Synthesis of Polycarbodiimide Compounds (2)]

The polycarbodiimide compounds obtained in the following Synthesis Examples were analyzed and evaluated in the same manner as the evaluation items (1) to (3) in the above [Synthesis of Polycarbodiimide Compounds (1)]. The evaluation results are shown in the following Table 4.

Synthesis Example 1

100 Parts by mass of hexamethylene diisocyanate (HDI), 80 parts by mass of polyethylene glycol monomethyl ether (MPEG400) (average molecular weight: 400), 158 parts by mass of diethylene glycol methyl ethyl ether (MEDG) as a solvent, and 2 parts by mass of 3-methyl-1-phenyl-2-phospholene-1-oxide (MPO) as a carbodiimidization catalyst were placed in a reaction container with a reflux tube and a stirrer and stirred under a nitrogen gas flow at 140° C. for 24 h to obtain a polycarbodiimide compound 1.

Synthesis Example 2

100 Parts by mass of hexamethylene diisocyanate (HDI), 82 parts by mass of polyethylene glycol monomethyl ether (MPEG550) (average molecular weight: 550), 28 parts by mass of dodecyl alcohol (DA), and 190 parts by mass of diethylene glycol methyl ethyl ether (MEDG) as a solvent were placed in a reaction container with a reflux tube and a stirrer and stirred under a nitrogen gas flow at 140° C. for 2 h. Then, 2 parts by mass of 3-methyl-1-phenyl-2-phospholene-1-oxide (MPO) as a carbodiimidization catalyst was added, and the mixture was stirred under a nitrogen gas flow at 140° C. for 24 h to obtain a polycarbodiimide compound 2.

Synthesis Examples 3 to 11 and 13 to 16

Polycarbodiimide compounds 3 to 11 and 13 to 16 were obtained in the same manner as Synthesis Example 2 with the types of the components and the amounts of the components blended, the carbodiimide polymerization reaction temperature, and the polymerization reaction time being as shown in the following Table 4, in Synthesis Example 2. In Table 4, the blanks indicate no blending.

Synthesis Example 12

156 Parts by mass of dicyclohexylmethane diisocyanate (HMDI), 159 parts by mass of polyethylene glycol monomethyl ether (MPEG400) (average molecular weight: 400), and 347 parts by mass of diethylene glycol monoethyl ether acetate (ECA) as a solvent were placed in a reaction container with a reflux tube and a stirrer and stirred under a nitrogen gas flow at 170° C. for 2 h. Then, 67 parts by mass of hexamethylene diisocyanate (HDI) and 2.2 parts by mass of 3-methyl-1-phenyl-2-phospholene-1-oxide (MPO) as a carbodiimidization catalyst were added, and the mixture was stirred under a nitrogen gas flow at 170° C. for 24 h to obtain a polycarbodiimide compound 12.

TABLE 4

| | | | Synthesis Examples (polycarbodiimide compounds) | | | | | | | |
|---|---|---|---|---|---|---|---|---|---|---|
| | | Unit | 1 | 2 | 3 | 4 | 5 | 6 | 7 | 8 |
| Aliphatic diisocyanate compounds | HDI | Parts by mass | 100 | 100 | 100 | 100 | 100 | 100 | 100 | 25 |
| | IPDI | Parts by mass | | | | | | 44 | 132 | 100 |
| | HXDI | Parts by mass | | | | | | | | |
| | XDI | Parts by mass | | | | | | | | |
| Other diisocyanate compounds | HMDI | Parts by mass | | | | | | | | |
| | TMXDI | Parts by mass | | | | | | | | |
| | TDI | Parts by mass | | | | | | | | |
| Organic compound | MPEG550 | Parts by mass | | 82 | 164 | | | | | |
| | MPEG400 | Parts by mass | 80 | | | | | 80 | 106 | 160 | 80 |
| | MTEG | Parts by mass | | | | | 31 | | | |
| | DA | Parts by mass | | 28 | | | | | | |
| Carbodiimidization catalyst | MPO | Parts by mass | 2 | 2 | 2 | 2 | 2 | 2 | 2 | 2 |
| Solvents | MEDG | Parts by mass | 158 | 190 | 244 | 250 | | | | |
| | DEDG | Parts by mass | | | | | | 158 | | |
| | ECA | Parts by mass | | | | | | | 221 | 347 | 183 |
| Carbodiimide polymerization reaction temperature | | ° C. | 140 | 140 | 140 | 140 | 140 | 140 | 140 | 140 |
| Carbodiimide polymerization reaction time | | h | 24 | 24 | 24 | 24 | 24 | 24 | 24 | 24 |

TABLE 4-continued

| State of reaction product | | | Liquid | Liquid | Liquid | Liquid | Liquid | Liquid | Liquid | Liquid |
|---|---|---|---|---|---|---|---|---|---|---|
| Carbodiimide group concentration A | % | | 9.72 | 7.96 | 5.83 | 16.76 | 10.20 | 10.58 | 10.40 | 9.52 |
| Weight average molecular weight Mw | — | | 16785 | 3925 | 5260 | 16295 | 13170 | 10391 | 7041 | 6293 |
| (A/Mw)×1000 | | | 0.58 | 2.03 | 1.11 | 1.03 | 0.77 | 1.02 | 1.48 | 1.51 |

| | | | Synthesis Examples (polycarbodiimide compounds) | | | | | | | |
|---|---|---|---|---|---|---|---|---|---|---|
| | | Unit | 9 | 10 | 11 | 12 | 13 | 14 | 15 | 16 |
| Aliphatic diisocyanate compounds | HDI | Parts by mass | | | | 67 | 84 | 59 | | 100 |
| | IPDI | Parts by mass | 132 | | | | | | | |
| | HXDI | Parts by mass | | 116 | | | | | | |
| | XDI | Parts by mass | | | 113 | | | | | |
| Other diisocyanate compounds | HMDI | Parts by mass | | | | 156 | | | | 100 |
| | TMXDI | Parts by mass | | | | | 123 | | | |
| | TDI | Parts by mass | | | | | | 61 | | |
| Organic compound | MPEG550 | Parts by mass | | | | | | | 164 | |
| | MPEG400 | Parts by mass | 80 | 80 | 80 | 159 | 64 | 140 | | 51 |
| | MTEG | Parts by mass | | | | | | | | |
| | DA | Parts by mass | | | | | | | | |
| Carbodiimid-ization catalyst | MPO | Parts by mass | 2.6 | 2.3 | 2.3 | 2.2 | 4.1 | 2.4 | 2 | 2 |
| Solvents | MEDG | Parts by mass | | | | | | | | |
| | DEDG | Parts by mass | | | | | | | | |
| | ECA | Parts by mass | 190 | 178 | 171 | 347 | 302 | 228 | | 137 |
| Carbodiimide polymerization reaction temperature | | °C. | 140 | 140 | 140 | 170 | 170 | 150 | 190 | 190 |
| Carbodiimide polymerization reaction time | | h | 24 | 24 | 24 | 24 | 24 | 10 | 24 | 24 |
| State of reaction product | | | Liquid | Liquid | Liquid | Liquid | Liquid | Liquid | Liquid | Liquid |
| Carbodiimide group concentration A | | % | 9.10 | 9.35 | 9.31 | 7.97 | 8.52 | 6.64 | 5.25 | 8.06 |
| Weight average molecular weight Mw | | — | 4332 | 9155 | 10053 | 5027 | 6233 | 7662 | 22294 | 6392 |
| (A/Mw)×1000 | | | 2.10 | 1.02 | 0.93 | 1.59 | 1.37 | 0.87 | 0.24 | 1.26 |

[Preparation of Resin Compositions (1)]

The aqueous resin used and the resin compositions prepared in the following Examples and Comparative Examples were analyzed and evaluated for the following evaluation items. The evaluation results are shown in the following Table 5.

(Evaluation Items)

(1) Measurement of Acid Value of a Solid Content of Aqueous Resin

Titration was performed in accordance with JIS K 5601-2-1: 1999 "Testing methods for paint components-Part 2: Component analysis in solvent soluble matter-Section V Acid value (titrimetric method)" by a potentiometric titrator (COM-1700A, manufactured by HIRANUMA SANGYO Co., Ltd.) using a 1 N potassium hydroxide aqueous solution, and the acid value of a solid content was obtained by the following formula (5):

$$\text{acid value of a solid content (mg KOH/g)} = (B \times f \times 56.11) \div S \quad (5)$$

wherein B represents the amount (mg) of the 1 N potassium hydroxide aqueous solution used in the titration, f represents the factor of the 1 N potassium hydroxide aqueous solution, and S represents the mass (g) of the dry resin.

(2) Coating Appearance (Film Forming Properties)

Each resin composition was cast on an ABS plate (200 mm×100 mm×1 mm) so that the thickness was 20 μm, thereby forming a coating, followed by crosslinking at 25° C. for 6 h. Thus, a test piece was made.

The state of the coating of the obtained test piece was visually observed, and evaluated by the following criteria:

Good: a smooth coating was made

Poor: a gel was observed (3) Rubbing Tests (Solvent Resistance)

(3-1) Methyl Ethyl Ketone (MEK)

The coating-formed surface of the test piece made in the coating appearance evaluation in the above (2) was double-rubbed (number of rubbings: 10 times) with a weighting of 900 g/cm² by a friction tester ER-1B (manufactured by Suga Test Instruments Co., Ltd.) using methyl ethyl ketone (MEK) for a solvent, and the state of the coating was visually observed, and evaluated on a 5-point scale by the following criteria:

5 points: no whitening
4 points: whitening was slightly observed
3 points: whitening was observed
2 points: part of the test piece dissolved
1 point: the test piece dissolved (3-2) Xylene Evaluation was performed in the same manner as the above (3-1) using xylene for the solvent.

(3-3) Ethanol

Evaluation was performed in the same manner as the above (3-1) with ethanol (99.5%) used for the solvent and the number of rubbings changed to 50 times.

(4) Adhesiveness (Cross-Cut Method)

A test was performed according to the cross-cut method defined in JIS K5600-5-6: 1999. Specifically, six cuts×six cuts were made at intervals of 1 mm in the coating-formed surface of the test piece made in the above (2), to form 25 squares having sides of 1 mm. Then, CELLOTAPE (registered trademark) (manufactured by Nichiban Co., Ltd.) was affixed, then allowed to stand for 1 min, and peeled at an angle close to 60° in 0.5 to 1 s. The test piece at this time was visually checked, and the test result was classified into the following 0 to 5. This six-level classification is as described in the above JIS K5600-5-6: 1999.

0: The edges of the cuts are completely smooth, and peeling does not occur in any square of the grid.

1: Small peeling of the coating at intersections of the cuts occurs. The peeling affecting the cross-cut portion is clearly 5% or less.

2: The coating peels along the edges of the cuts and/or at the intersections. The peeling affecting the cross-cut portion is clearly more than 5% but 15% or less.

3: Large peeling of the coating occurs partially or fully along the edges of the cuts, and/or various portions of the squares peel partially or fully. The peeling affecting the cross-cut portion is clearly more than 15% but 35% or less.

4: Large peeling of the coating occurs partially or fully along the edges of the cuts, and/or the squares in several places peel partially or fully. The peeling affecting the cross-cut portion is clearly 35% or less.

5: Any extent of peeling that cannot be classified even into the classification 4.

(5) Hot Water Resistance Tests (80° C., 1 h)

(5-1) Cross-Cut Method

A test was performed according to the cross-cut method defined in JIS K5600-5-6: 1999. Specifically, the test piece made in the above (2) was immersed in hot water at 80° C. for 1 h, then a test was performed in the same manner as the evaluation of adhesiveness in the above (4), and the test result was classified into 0 to 5.

(5-2) Appearance

The test piece made in the above (2) was immersed in hot water at 80° C. for 1 h, and then the state of the coating was visually observed, and evaluated by the following criteria:

Good: no change
Poor: at least one of whitening, the generation of small bubbles, and penetration was confirmed (6) Storage Stability Each resin composition was stored at room temperature (25° C.) for 24 h or 48 h, and the state after the storage was visually observed, and evaluated by the following criteria:

Good: no change from the state immediately after preparation
Fair: viscosity increase is seen, but the resin composition has fluidity
Poor: the resin composition gelled Example B1

0.92 Parts by mass of the polycarbodiimide compound 1 (resin crosslinking agent) obtained in Synthesis Example 1, as a polycarbodiimide compound, and 10 parts by mass of NeoRez R-966 (aqueous polyurethane resin, manufactured by DSM, trade name, solids 33%, acid value of a solid content 19 mg KOH/g) as an aqueous resin were mixed to prepare a resin composition.

Examples B2 to B18 and Comparative Examples B1 to B5

Resin compositions were prepared in the same manner as Example B1 with the types of the components and the amounts of the components blended being as shown in the following Table 5. In Table 5, the blanks indicate no blending.

TABLE 5

| | | | Examples | | | | | | | | | | | | |
|---|---|---|---|---|---|---|---|---|---|---|---|---|---|---|---|
| | | Unit | B1 | B2 | B3 | B4 | B5 | B6 | B7 | B8 | B9 | B10 | B11 | B12 |
| Aqueous polyurethane resin | NeoRez R-966 (acid value of a solid content 19 mgKOH/g) | Parts by mass | 10 | 10 | 10 | 10 | 10 | 10 | 10 | 10 | 10 | 10 | 10 | 10 |
| Polycarbodiimide compounds | 1 | Parts by mass | 0.92 | | | | | | | | | | | |
| | 2 | Parts by mass | | 1.12 | | | | | | | | | | |
| | 3 | Parts by mass | | | 1.53 | | | | | | | | | |
| | 4 | Parts by mass | | | | 0.89 | | | | | | | | |
| | 5 | Parts by mass | | | | | 0.88 | | | | | | | |
| | 6 | Parts by mass | | | | | | 0.84 | | | | | | |
| | 7 | Parts by mass | | | | | | | 0.86 | | | | | |
| | 8 | Parts by mass | | | | | | | | 0.94 | | | | |

TABLE 5-continued

| | | | | | | | | | | | | | | |
|---|---|---|---|---|---|---|---|---|---|---|---|---|---|---|
| | 9 | Parts by mass | | | | | | | | | | 0.98 | | |
| | 10 | Parts by mass | | | | | | | | | | | 0.96 | |
| | 11 | Parts by mass | | | | | | | | | | | | 0.96 |
| | 12 | Parts by mass | | | | | | | | | | | | | 1.12 |
| | 13 | Parts by mass | | | | | | | | | | | | |
| | 14 | Parts by mass | | | | | | | | | | | | |
| | 15 | Parts by mass | | | | | | | | | | | | |
| | 16 | Parts by mass | | | | | | | | | | | | |
| a/b | | — | 1.0 | 1.0 | 1.0 | 1.0 | 1.0 | 1.0 | 1.0 | 1.0 | 1.0 | 1.0 | 1.0 | 1.0 |
| Coating appearance (film forming properties) | | | Good | Good | Good | Good | Good | Good | Good | Good | Good | Good | Good | Good |
| Rubbing tests (solvent resistance) | MEK | Points | 5 | 5 | 5 | 5 | 5 | 5 | 5 | 5 | 5 | 5 | 5 | 5 |
| | Xylene | Points | 5 | 5 | 5 | 5 | 5 | 5 | 5 | 5 | 5 | 5 | 5 | 5 |
| | Ethanol | Points | 5 | 4 | 4 | 5 | 5 | 5 | 5 | 5 | 5 | 5 | 5 | 4 |
| Adhesiveness | Cross-cut method | — | 0 | 0 | 0 | 0 | 0 | 0 | 1 | 1 | 1 | 0 | 0 | 1 |
| Hot water resistance tests (80° C., 1 h) | Cross-cut method | — | 0 | 1 | 0 | 0 | 0 | 0 | 1 | 1 | 1 | 0 | 0 | 1 |
| | Appearance | | Good | Good | Good | Good | Good | Good | Good | Good | Good | Good | Good | Good |
| Storage stability (25° C.) | 24 h | | Fair | Good | Good | Good | Good | Good | Good | Good | Good | Good | Good | Good |
| | 48 h | | Fair | Fair | Fair | Fair | Fair | Fair | Good | Good | Good | Good | Fair | Fair | Good |

| | | | Examples | | | | | | Comparative Examples | | | | |
|---|---|---|---|---|---|---|---|---|---|---|---|---|---|
| | | Unit | B13 | B14 | B15 | B16 | B17 | B18 | B1 | B2 | B3 | B4 | B5 |
| Aqueous polyurethane resin | NeoRez R-966 (acid value of a solid content 19 mgKOH/g) | Parts by mass | 10 | 10 | 10 | 10 | 10 | 10 | 10 | 10 | 10 | 10 | 10 |
| Polycarbodiimide compounds | 1 | Parts by mass | | | 0.37 | 0.64 | 1.38 | 2.76 | 0.18 | 4.60 | | | |
| | 2 | Parts by mass | | | | | | | | | | | |
| | 3 | Parts by mass | | | | | | | | | | | |
| | 4 | Parts by mass | | | | | | | | | | | |
| | 5 | Parts by mass | | | | | | | | | | | |
| | 6 | Parts by mass | | | | | | | | | | | |
| | 7 | Parts by mass | | | | | | | | | | | |
| | 8 | Parts by mass | | | | | | | | | | | |
| | 9 | Parts by mass | | | | | | | | | | | |
| | 10 | Parts by mass | | | | | | | | | | | |
| | 11 | Parts by mass | | | | | | | | | | | |
| | 12 | Parts by mass | | | | | | | | | | | |
| | 13 | Parts by mass | 1.05 | | | | | | | | | | |
| | 14 | Parts by mass | | 1.35 | | | | | | | | | |
| | 15 | Parts by mass | | | | | | | | | | 1.70 | |
| | 16 | Parts by mass | | | | | | | | | | | 1.11 |
| a/b | | — | 1.0 | 1.0 | 0.4 | 0.7 | 1.5 | 3.0 | 0.2 | 5.0 | 1.0 | 1.0 | 0 |
| Coating appearance (film forming properties) | | | Good | Good | Good | Good | Good | Good | Good | Poor | Good | Good | Good |
| Rubbing tests (solvent resistance) | MEK | Points | 5 | 5 | 5 | 5 | 5 | 5 | 2 | 5 | 2 | 2 | 1 |
| | Xylene | Points | 4 | 5 | 5 | 5 | 5 | 5 | 2 | 5 | 2 | 2 | 1 |
| | Ethanol | Points | 4 | 4 | 4 | 5 | 5 | 5 | 2 | 5 | 2 | 2 | 1 |

TABLE 5-continued

| | | | | | | | | | | | | | |
|---|---|---|---|---|---|---|---|---|---|---|---|---|---|
| Adhesiveness | Cross-cut method | — | 1 | 1 | 1 | 0 | 0 | 0 | 3 | 2 | 3 | 5 | 5 |
| Hot water resistance tests (80° C., 1 h) | Cross-cut method | — | 1 | 1 | 1 | 0 | 0 | 0 | 4 | 2 | 3 | 5 | 5 |
| | Appearance | | Good | Good | Good | Good | Good | Good | Good | Good | Poor | Good | Good |
| Storage stability (25° C.) | 24 h | | Good | Good | Good | Good | Good | Fair | Good | Poor | Poor | Good | Good |
| | 48 h | | Good | Fair | Good | Fair | Fair | Poor | Good | Poor | Poor | Good | Good |

It was shown that for all of Examples B1 to B18, the film forming properties, solvent resistance, adhesiveness, and hot water resistance of the coatings made at 25° C. were excellent.

On the other hand, for Comparative Example B1 in which a/b was 0.2, the solvent resistance and the adhesiveness were poor, and for Comparative Example B2 in which a/b was 5.0, the film forming properties and adhesiveness of the coating, and the storage stability of the resin composition were poor. In addition, for Comparative Example B3 in which a polycarbodiimide compound not satisfying formula (1) was used, the solvent resistance, the adhesiveness, the hot water resistance test, and the storage stability of the resin composition were poor. For Comparative Example B4 in which a polycarbodiimide compound having no carbodiimide group derived from an aliphatic diisocyanate compound having at least one primary isocyanate group was used, the solvent resistance was poor. Further, for Comparative Example B5 in which no polycarbodiimide compound was added, the solvent resistance was poor.

[Preparation of Resin Compositions (2)]

The aqueous resins used and the resin compositions prepared in the following Examples and Comparative Examples were analyzed and evaluated in the same manner as the evaluation items (1) to (6) in the above [Preparation of Resin Compositions (1)]. The evaluation results are shown in the following Table 6.

The details of the components used in the preparation of the resin compositions and described in Table 6 are as follows.

<Aqueous Polyurethane Resins Having Acid Value of a Solid Content of 5 mg KOH/g or More>

NeoRez R-650: manufactured by DSM, trade name, solids 38% by mass, acid value of a solid content 5.6 mg KOH/g NeoRez R-940: manufactured by DSM, trade name, solids 31% by mass, acid value of a solid content 37 mg KOH/g <Aqueous Polyurethane Resin Having Acid Value of a Solid Content of Less than 5 mg KOH/g>

NeoRez R-4000: manufactured by DSM, trade name, solids 35% by mass, acid value of a solid content 2 mg KOH/g <Aqueous Acrylic Resins Having Acid Value of a Solid Content of 5 mg KOH/g or More>

Primal AC-261P: manufactured by The Dow Chemical Company, trade name, solids 50% by mass, acid value of a solid content 15 mg KOH/g NeoCryl (registered trademark) A639: manufactured by DSM, trade name, solids 45% by mass, acid value of a solid content 42 mg KOH/g <Aqueous Acrylic Resin Having Acid Value of A Solid Content of Less Than 5 mg KOH/g>

NeoCryl (registered trademark) XK-103: manufactured by DSM, trade name, solids 45% by mass, acid value of a solid content 3.2 mg KOH/g <Aqueous Polyester Resin Having Acid Value of a Solid Content of 5 mg KOH/g or More>

Z-730: manufactured by GOO Chemical Co., Ltd., trade name, solids 25% by mass, acid value of a solid content 60 mg KOH/g <Aqueous Polyester Resin Having Acid Value of a Solid Content of Less than 5 Mg KOH/g>

RZ-105: manufactured by GOO Chemical Co., Ltd., trade name, solids 25% by mass, acid value of a solid content 4 mg KOH/g Example B19

0.31 Parts by mass of the polycarbodiimide compound 1 (resin crosslinking agent) obtained in Synthesis Example 1, as a polycarbodiimide compound, 10 parts by mass of NeoRez R-650 (aqueous polyurethane resin, manufactured by DSM, trade name) as an aqueous resin, 0.24 parts by mass of RHEOLATE 210 (manufactured by Inabata & Co., Ltd., trade name) as a viscosity adjusting agent, and 0.02 parts by mass of Emacol NS Blue KRN (manufactured by SANYO COLOR WORKS, Ltd., trade name) as a blue pigment were mixed to prepare a resin composition.

Examples B20 to B28 and Comparative Examples B6 to B14

Resin compositions were prepared in the same manner as Example B19 with the types of the components and the amounts of the components blended being as shown in the following Table 6. In Table 6, the blanks indicate no blending.

TABLE 6

|  |  | Unit | Examples ||||||||||
|  |  |  | B19 | B20 | B21 | B22 | B23 | B24 | B25 | B26 | B27 | B28 |
|---|---|---|---|---|---|---|---|---|---|---|---|---|
| Aqueous polyurethane resins | NeoRez R-650 (acid value of a solid content 5.6 mgKOH/g) | Parts by mass | 10 | 10 |  |  |  |  |  |  |  |  |
|  | NeoRez R-940 (acid value of a solid content 37 mgKOH/g) | Parts by mass |  |  | 10 | 10 |  |  |  |  |  |  |
|  | NeoRez R-4000 (acid value of a solid content 2 mgKOH/g) | Parts by mass |  |  |  |  |  |  |  |  |  |  |
|  | Primal AC-261P (acid value of a solid content 15 mgKOH/g) | Parts by mass |  |  |  |  | 10 | 10 |  |  |  |  |
|  | NeoCryl A-639 (acid value of a solid content 42 mgKOH/g) | Parts by mass |  |  |  |  |  |  | 10 | 10 |  |  |
|  | NeoCryl XK-103 (acid value of a solid content 3.2 mgKOH/g) | Parts by mass |  |  |  |  |  |  |  |  |  |  |
|  | Z-730 | Parts by mass |  |  |  |  |  |  |  |  | 10 | 10 |
| Aqueous polyester resins | (acid value of a solid content 60 mgKOH/g) |  |  |  |  |  |  |  |  |  |  |  |
|  | RZ-105 (acid value of a solid content 4 mgKOH/g) | Parts by mass |  |  |  |  |  |  |  |  |  |  |
| Polycarbodiimide compounds | 1 | Parts by mass | 0.31 |  | 1.68 |  | 1.10 |  | 2.77 |  | 2.2 |  |
|  | 2 | Parts by mass |  | 0.38 |  | 2.05 |  | 1.34 |  | 3.38 |  | 2.69 |
| Viscosity adjusting agent | RHEOLATE210 | Parts by mass | 0.24 | 0.24 | 0.24 | 0.24 | 0.24 | 0.24 | 0.24 | 0.24 | 0.24 | 0.24 |
| Blue pigment | Emacol NS Blue KRN | Parts by mass | 0.02 | 0.02 | 0.02 | 0.02 | 0.24 | 0.24 | 0.24 | 0.24 | 0.24 | 0.24 |
| a/b |  |  | 1.0 | 1.0 | 1.0 | 1.0 | 1.0 | 1.0 | 1.0 | 1.0 | 1.0 | 1.0 |
| Coating appearance (film forming properties) |  |  | Good | Good | Good | Good | Good | Good | Good | Good | Good | Good |
| Rubbing tests (solvent resistance) | MEK | Points | 5 | 5 | 5 | 5 | 5 | 5 | 5 | 5 | 5 | 5 |
|  | Xylene | Points | 5 | 5 | 5 | 5 | 5 | 5 | 5 | 5 | 5 | 5 |
|  | Ethanol | Points | 5 | 5 | 5 | 5 | 5 | 4 | 5 | 4 | 5 | 4 |
| Adhesiveness | Cross-cut method | — | 0 | 0 | 0 | 0 | 0 | 0 | 0 | 0 | 1 | 1 |
| Hot water resistance tests (80° C., 1 h) | Cross-cut method | — | 0 | 1 | 0 | 0 | 0 | 0 | 0 | 0 | 1 | 1 |
|  | Appearance |  | Good | Good | Good | Good | Good | Good | Good | Good | Good | Good |
| Storage stability (25° C.) | 24 h |  | Good | Good | Good | Good | Good | Good | Good | Good | Good | Good |
|  | 48 h |  | Fair | Fair | Fair | Fair | Fair | Fair | Fair | Fair | Fair | Fair |

|  |  |  | Comparative Examples |||||||||
|  |  | Unit | B6 | B7 | B8 | B9 | B10 | B11 | B12 | B13 | B14 |
|---|---|---|---|---|---|---|---|---|---|---|---|
| Aqueous polyurethane resins | NeoRez R-650 (acid value of a solid content 5.6 mgKOH/g) | Parts by mass |  |  |  |  |  |  |  |  |  |
|  | NeoRez R-940 (acid value of a solid content 37 mgKOH/g) | Parts by mass |  |  |  |  |  |  |  |  |  |
|  | NeoRez R-4000 (acid value of a solid content 2 mgKOH/g) | Parts by mass | 10 | 10 | 10 |  |  |  |  |  |  |

TABLE 6-continued

| | | | | | | | | | | | |
|---|---|---|---|---|---|---|---|---|---|---|---|
| Aqueous polyester resins | Primal AC-261P (acid value of a solid content 15 mgKOH/g) | Parts by mass | | | | | | | | | |
| | NeoCryl A-639 (acid value of a solid content 42 mgKOH/g) | Parts by mass | | | | | | | | | |
| | NeoCryl XK-103 (acid value of a solid content 3.2 mgKOH/g) | Parts by mass | | | 10 | 10 | 10 | | | | |
| | Z-730 (acid value of a solid content 60 mgKOH/g) | Parts by mass | | | | | | | | | |
| | RZ-105 (acid value of a solid content 4 mgKOH/g) | Parts by mass | | | | | | | 10 | 10 | 10 |
| Polycarbodiimide compounds | 1 | Parts by mass | 0.1 | 0.31 | | 0.21 | 0.63 | | 0.15 | 0.44 | |
| | 2 | Parts by mass | | | 0.13 | | | 0.26 | | | 0.18 |
| Viscosity adjusting agent | RHEOLATE210 | Parts by mass | 0.24 | 0.24 | 0.24 | 0.24 | 0.24 | 0.24 | 0.24 | 0.24 | 0.24 |
| Blue pigment | Emacol NS Blue KRN | Parts by mass | 0.24 | 0.24 | 0.24 | 0.24 | 0.24 | 0.24 | 0.24 | 0.24 | 0.24 |
| a/b | | | 1.0 | 3.0 | 1.0 | 1.0 | 3.0 | 1.0 | 1.0 | 3.0 | 1.0 |
| Coating appearance (film forming properties) | | | Good | Good | Good | Good | Good | Good | Good | Good | Good |
| Rubbing tests (solvent resistance) | MEK | Points | 2 | 2 | 2 | 2 | 2 | 2 | 2 | 2 | 2 |
| | Xylene | Points | 2 | 2 | 2 | 2 | 2 | 2 | 2 | 2 | 2 |
| | Ethanol | Points | 2 | 2 | 2 | 2 | 2 | 2 | 2 | 2 | 2 |
| Adhesiveness | Cross-cut method | — | 4 | 4 | 4 | 4 | 4 | 5 | 4 | 4 | 5 |
| Hot water resistance tests (80° C., 1 h) | Cross-cut method | — | 4 | 4 | 4 | 4 | 4 | 5 | 4 | 4 | 5 |
| | Appearance | | Poor | Poor | Poor | Poor | Poor | Poor | Poor | Poor | Poor |
| Storage stability (25° C.) | 24 h | | Good | Good | Good | Good | Good | Good | Good | Good | Good |
| | 48 h | | Good | Good | Good | Good | Good | Good | Good | Good | Good |

It was shown that for all of Examples B19 to B28, the film forming properties, solvent resistance, adhesiveness, and hot water resistance of the coatings made at 25° C. were excellent.

On the other hand, for all of the resin compositions of Comparative Examples B6 to B14 comprising an aqueous resin having an acid value of a solid content of less than 5 mg KOH/g, together with a polycarbodiimide compound, the coatings dissolved partially in the solvents, and the adhesiveness and the hot water resistance were poor.

The invention claimed is:

1. A polycarbodiimide compound derived from an aliphatic diisocyanate compound having at least one primary isocyanate group,
the polycarbodiimide compound having a structure in which all ends are capped with an organic compound having a functional group that reacts with an isocyanate group,
a carbodiimide group concentration A (%) of the polycarbodiimide compound, and a polystyrene equivalent weight average molecular weight Mw of the polycarbodiimide compound as measured using gel permeation chromatography (GPC) satisfying the following formula (1):

$$(A/Mw) \times 1000 \geq 0.55 \quad (1),$$

wherein a number of carbodiimide groups in one molecule is 3 or more and 7 or less,
wherein the aliphatic diisocyanate compound is at least one selected from the group consisting of hexamethylene diisocyanate, isophorone diisocyanate, 1,3-bis(isocyanatomethyl)cyclohexane, and xylylene diisocyanate, and
wherein in a case that the aliphatic diisocyanate compound is isophorone diisocyanate or hexamethylene diisocyanate, the functional group that the organic compound has is at least one selected from the group consisting of an amino group, an isocyanate group, an epoxy group, and a carboxy group.

2. The polycarbodiimide compound according to claim 1, wherein the organic compound further has a hydrophilic group in addition to the functional group.

3. The polycarbodiimide compound according to claim 2, wherein the hydrophilic group is an organic group represented by the following general formula (I):

$$R^1-(O-CHR^2-CH_2)_m- \quad (I)$$

wherein $R^1$ is an alkyl group having 1 to 4 carbon atoms, and $R^2$ is a hydrogen atom or a methyl group; when a plurality of $R^2$ are present, the $R^2$ may be the same as or different from each other; and m represents an integer of 1 to 30.

4. The polycarbodiimide compound according to claim 3, wherein $R^2$ in the general formula (I) is a hydrogen atom.

5. The polycarbodiimide compound according to claim 3, wherein $R^1$ in the general formula (I) is a methyl group or an ethyl group.

6. The polycarbodiimide compound according to claim 2, being water-soluble or water-dispersible.

7. The polycarbodiimide compound according to claim 1, further having a carbodiimide group derived from a diisocyanate compound having no primary isocyanate group.

8. The polycarbodiimide compound according to claim 7, further having at least one selected from the group consisting of a carbodiimide group derived from a diisocyanate compound having two secondary isocyanate groups, a carbodiimide group derived from a diisocyanate compound having two tertiary isocyanate groups, and a carbodiimide group derived from a diisocyanate compound having two aromatic isocyanate groups.

9. The polycarbodiimide compound according to claim 8, having at least one selected from the group consisting of a carbodiimide group derived from a diisocyanate compound having two secondary isocyanate groups, and a carbodiimide group derived from a diisocyanate compound having two tertiary isocyanate groups.

10. A method for producing the polycarbodiimide compound according to claim 1, wherein
a carbodiimide polymerization reaction is performed in a solvent, and a temperature of the carbodiimide polymerization reaction is 115° C. or higher and 165° C. or lower.

11. The method for producing the polycarbodiimide compound according to claim 10, wherein the organic compound is added before start of the carbodiimide polymerization reaction, at the start of the carbodiimide polymerization reaction, or during the carbodiimide polymerization reaction.

12. The method for producing the polycarbodiimide compound according to claim 10, wherein the solvent is an aprotic solvent.

13. The method for producing the polycarbodiimide compound according to claim 12, wherein the aprotic solvent is an aprotic water-soluble solvent.

14. A resin composition comprising a polycarbodiimide compound derived from an aliphatic diisocyanate compound having at least one primary isocyanate group and an aqueous resin having an acid value,
wherein the polycarbodiimide compound has a structure in which all ends are capped with an organic compound having a functional group that reacts with an isocyanate group,
wherein a carbodiimide group concentration A (%) of the polycarbodiimide compound, and a polystyrene equivalent weight average molecular weight Mw of the polycarbodiimide compound as measured using gel permeation chromatography (GPC) satisfy the following formula (1):

$$(A/\mathrm{Mw}) \times 1000 \geq 0.55 \qquad (1),$$

wherein a number of carbodiimide groups in one molecule is 3 or more and 7 or less, and
wherein an acid value of a solid content of the aqueous resin is 5 mg KOH/g or more, and a ratio of a number of moles a of the carbodiimide group of the polycarbodiimide compound to a number of moles b of a functional group that reacts with a carbodiimide group, as calculated from the acid value of a solid content of the aqueous resin, a/b, is 1.5 or more and 4.5 or less.

15. The resin composition according to claim 14, wherein a functional group that the aqueous resin has is a carboxy group.

16. The resin composition according to claim 14, wherein the aqueous resin is at least one resin selected from the group consisting of polyurethane resins, acrylic resins, and polyester resins.

17. A paint composition comprising the resin composition according to claim 14.

18. A coating agent composition comprising the resin composition according to claim 14.

19. An ink composition comprising the resin composition according to claim 14.

* * * * *